(No Model.)
S. ELLIOTT.
SULKY.
No. 498,709.  Patented May 30, 1893.
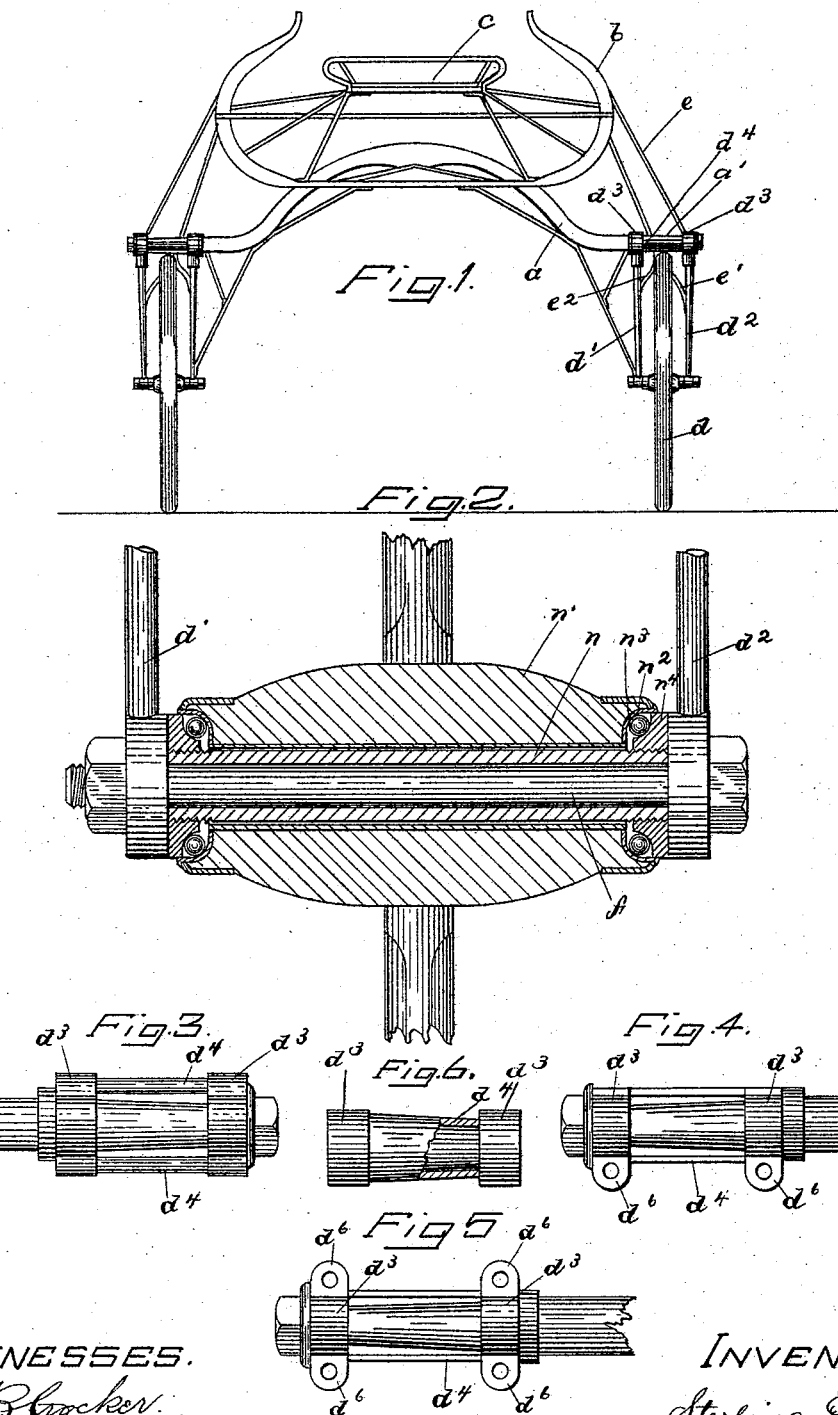
WITNESSES.
C. B. Crocker.
William C. Jennings
INVENTOR.
Sterling Elliott
by B. J. Noyes,
Atty.

UNITED STATES PATENT OFFICE.

STERLING ELLIOTT, OF NEWTON, MASSACHUSETTS.

SULKY.

SPECIFICATION forming part of Letters Patent No. 498,709, dated May 30, 1893.

Application filed August 20, 1892. Serial No. 443,672. (No model.)

*To all whom it may concern:*

Be it known that I, STERLING ELLIOTT, of Newton, county of Middlesex, State of Massachusetts, have invented an Improvement in Sulkies, of which the following description, in connection with the accompanying drawings, is a specification, like letters on the drawings representing like parts.

This invention relates to sulkies, and has for its object to provide an ordinary sulky with wheels of small diameter preferably having pneumatic or equivalent tires, and ball bearings.

In accordance with this invention, the wheels are made of sufficiently small diameter to turn freely beneath the usual axle spindles, and are supported by forks or equivalents, depending from the axle spindles. If forks are employed they furnish ample bearings at both sides of the wheels. The wheels will preferably be provided with ball bearings which are so constructed that the wheels may be removed from their supports without disturbing the adjustment of the balls and their supports.

Figure 1, shows a rear side view of a sulky embodying this invention; Fig. 2, a longitudinal section of the hub of one of the wheels showing the ball bearings, and support or axle for the wheel; Fig. 3, a detail to be referred to, and Figs. 4, 5, and 6, modifications to be referred to.

The axle $a$, arched as shown, the shaft $b$, and seat $c$, and numerous brace rods are all of any usual or suitable construction.

The usual large wheels are removed from the axle spindles $a'$, and wheels $d$, of smaller diameter as compared with the usual wheels are provided, they being sufficiently small to occupy a position and turn freely beneath the axle spindles $a'$. Forks are herein shown as the supports for the wheels $d$, they being made alike, and each consisting of two like vertical arms $d'$, $d^2$, arranged in parallelism, and screwed or otherwise fitted into sockets formed in bosses on the under side of collars $d^3$. The collars $d^3$, see Figs. 1 and 2, are rigidly connected together by short connecting rods or bars $d^4$. These connected collars constitute a socket, frame, or holder, which is placed on the usual axle spindle, and is restrained from rotation thereon by any suitable means, such for instance, as by the brace rods or guards $e$, $e'$, $e^2$, which connect it with the shaft. The lower ends of the arms $d'$, $d^2$, of the fork or wheel-support have holes through them, which receive a transverse bolt $f$, see Fig. 2, by means of which the lower ends are connected together. A sleeve $n$, is placed on said bolt $f$ which is externally screw threaded for a short distance at each end, and the hub $n$ of the wheel is mounted on said sleeve, and in each end of said hub $n'$, a metallic cup $n^2$, is seated which receives the balls $n^3$. A disk or collar $n^4$ having a ball receiving groove is screwed on to the ends of the sleeve to hold the balls in place in their cups or holders. To adjust the balls to compensate for wear, the collars or disk $n^4$, will be tightened.

By withdrawing the bolt $f$, it will be seen that the sleeve $n$, with the hub $n'$, and collars or disks $n^4$, and balls, may be removed without disturbing the relation of the parts one with relation to the other.

In lieu of the socket or frame shown in Fig. 3, to which the arms of the fork are connected the forms shown in Figs. 4 and 5, may be substituted.

Referring to Fig. 4, the collars $d^3$ are connected by short connecting rods or bars $d^4$, and ears $d^6$, are formed on one side of said collars which receive the upper ends of the arms of the fork.

Referring to Fig. 5, the collars $d^3$ are also connected together by short connecting rods or bars $d^4$, and ears $d^6$ are formed on each side of said collars, and the arms of the fork will be bifurcated and held securely in said ears. In place of the arms $d^4$ I might employ a tube which would encircle the axle as shown in Fig. 6. Hence I do not desire to limit my invention to any particular form or construction of socket or support for the arms for the fork, so long as it is so constructed as to be held in position on the usual axle spindle $a'$.

It is obvious that the particular construction of bearing for the wheel enables said wheels to be used in connection with other vehicles or bicycles and the like.

In lieu of the rods or bars herein shown for restraining the forks from rotation on the axle spindles $a'$, any other suitable means may be employed.

While I prefer to employ forks as supports for the wheels, because bearings are provided at each side thereof, yet any other form of wheel supports depending from the usual axle spindles I deem comes within the spirit and scope of this invention.

I do not here claim the constructions shown in the drawings of this case and claimed in my application Serial No. 436,758, nor in my application executed May 5, 1893.

I claim—

1. In a sulky, the seat, shafts and axle, having axle spindles, combined with wheels, and wheel supports depending from said axle spindles, substantially as described.

2. In a sulky, the seat, shafts and axle having axle spindles $a'$, combined with wheels and forks supporting them depending from the axle spindles $a'$, substantially as described.

3. In a sulky, the seat, shafts and axle, having axle spindles $a'$, combined with wheels and forks supporting them, and sockets or frames to which the arms of said forks are connected, said sockets being constructed and arranged to be held in position on the said axle spindles $a'$, substantially as described.

4. In a sulky, the seat, shafts and axle, having axle spindles $a'$, combined with wheels and forks supporting them, comprising rigidly connected collars on the axle spindles $a'$, and depending arms, substantially as described.

5. In a sulky, the seat, shafts and axle, having spindles $a'$, combined with wheels and forks supporting them depending from the axle spindles $a'$, and means substantially as described for restraining said forks from rotation on said axle spindles, substantially as described.

In testimony whereof I have signed my name to this specification in the presence of two subscribing witnesses.

STERLING ELLIOTT.

Witnesses:
 BERNICE J. NOYES,
 C. B. CROCKER.